United States Patent
Nakada

(10) Patent No.: US 9,573,504 B2
(45) Date of Patent: Feb. 21, 2017

(54) CUSHION PAD

(71) Applicant: TOYO TIRE & RUBBER CO., LTD., Osaka-shi, Osaka (JP)

(72) Inventor: Toru Nakada, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 0 days.

(21) Appl. No.: 14/827,524

(22) Filed: Aug. 17, 2015

(65) Prior Publication Data

US 2016/0052435 A1    Feb. 25, 2016

(30) Foreign Application Priority Data

Aug. 19, 2014  (JP) .................. 2014-166296

(51) Int. Cl.
*B60N 2/64* (2006.01)
*A47C 27/14* (2006.01)
*A47C 27/15* (2006.01)
*A47C 7/02* (2006.01)

(52) U.S. Cl.
CPC .............. *B60N 2/646* (2013.01); *A47C 7/022* (2013.01); *A47C 27/14* (2013.01); *A47C 27/15* (2013.01)

(58) Field of Classification Search
CPC ......... B60N 2/646; A47C 7/022; A47C 27/14; A47C 27/15
See application file for complete search history.

(56) References Cited

U.S. PATENT DOCUMENTS

| | | | |
|---|---|---|---|
| 7,661,764 B2 * | 2/2010 | Ali .................... | B68G 7/00 297/452.26 |
| 2012/0313421 A1 * | 12/2012 | Kondo ............... | A47C 27/15 297/452.48 |

FOREIGN PATENT DOCUMENTS

| | | | |
|---|---|---|---|
| JP | 2002065409 A | * | 3/2002 |
| JP | 2010-280855 A | | 12/2010 |

* cited by examiner

*Primary Examiner* — Anthony D Barfield
(74) *Attorney, Agent, or Firm* — Westerman, Hattori, Daniels & Adrian, LLP

(57) ABSTRACT

[Problem]
To provide a cushion pad that reduces the bottom-hitting feeling.
[Solution]
In a support portion, the ratio of the hardness of a bottom surface layer including the bottom surface to the hardness of a seating layer including the seating surface is set to 1.0 to 1.1. The hardness of the seating layer is set to be identical to the hardness of the bottom surface layer or slightly smaller than the hardness of the bottom surface layer. This allows reducing the increase in reactive force by the bottom surface layer while supporting the load of the seated person by the bottom surface layer. This allows reducing the bottom-hitting feeling.

6 Claims, 3 Drawing Sheets

CUSHION PAD

TECHNICAL FIELD

The present invention relates to a cushion pad, particularly, to a cushion pad that reduces a bottom-hitting feeling.

BACKGROUND ART

A cushion pad used for, for example, a seat and a chair such as furniture equipped with transportation means such as a vehicle, a ship, and an aircraft requires reduction in thickness to ensure the indoor space and reduce the mass of the transportation means. Reduction in thickness of the cushion pad causes a bottom-hitting feeling (feeling of contact with the bottom) so as to cause poor seating comfort. Accordingly, Patent Literature 1 discloses the technology that sets the difference between the whole density and the core density of the cushion pad to 5 kg/m$^3$ or less to reduce the bottom-hitting feeling.

CITATION LIST

Patent Literature

[Patent Literature 1] JP-A No. 2010-280855

SUMMARY OF INVENTION

Technical Problem

However, in the above-described conventional technology, reduction in bottom-hitting feeling is insufficient.

The present invention has been made to solve the above-described problem, and it is an object of the present invention to provide a cushion pad that reduces the bottom-hitting feeling.

Solution to Problem and Advantageous Effects of Invention

To achieve this object, with the cushion pad according to claim 1, a cushion pad includes a support portion having: a seating surface on which a seated person is seated; and a bottom surface on an opposite side to the seating surface. The support portion has a ratio of a hardness of a bottom surface layer including the bottom surface to a hardness of a seating layer including the seating surface. The ratio is set to 1.0 to 1.1. The seating layer and the bottom surface layer are at least a part of a plurality of layered test pieces sampled by equally dividing the support portion in a thickness direction. The hardness is a 25% hardness measured in compliance with D method specified in JIS K6400-2 (the 2012 edition) regarding the test piece.

The hardness of the seating layer is identical to the hardness of the bottom surface layer or slightly smaller than the hardness of the bottom surface layer. This allows providing a soft feeling to the seated person during seating. Furthermore, when the hardness of the bottom surface layer is 1.0 to 1.1 with respect to the hardness of the seating layer, the bottom surface layer can support the load of the seated person while reducing the increase in reactive force by the bottom surface layer. This consequently provides an effect that allows reducing the bottom-hitting feeling.

With the cushion pad according to claim 2, the test piece includes a first core layer positioned between a thickness center and the seating layer. The thickness center is a center in the thickness direction sandwiched between the seating surface and the bottom surface. The support portion has a ratio of a hardness of the first core layer to the hardness of the seating layer. The ratio is set to 1.0 to 1.1. Hence, the first core layer allows reducing the increase in reactive force by the first core layer while supporting the load of the seated person. In addition to the effect of claim 1, this provides an effect that allows further reducing the bottom-hitting feeling.

With the cushion pad according to claim 3, the test piece includes a second core layer positioned between a thickness center and the bottom surface layer. The thickness center is a center in the thickness direction sandwiched between the seating surface and the bottom surface. The support portion has a ratio of a hardness of the second core layer to the hardness of the seating layer. The ratio is set to 1.0 to 1.1. Hence, the second core layer allows reducing the increase in reactive force by the second core layer while supporting the load of the seated person. In addition to the effect of claim 1, this provides an effect that allows further reducing the bottom-hitting feeling.

With the cushion pad according to claim 4, the support portion has a ratio of a hardness of the bottom surface layer to the hardness of the first core layer. The ratio is set to 1.0 to 1.1. Hence, the bottom surface layer allows reducing the increase in reactive force by the bottom surface layer while supporting the load of the seated person. In addition to the effect of claim 2, this provides an effect that allows reducing the bottom-hitting feeling.

With the cushion pad according to claim 5, the support portion is integrally molded by a single foamed synthetic resin material. Hence, this allows eliminating the processes for burying an insert material to adjust the hardness and for laminating a plurality of layers having similar hardnesses in the manufacturing process of the cushion pad. Accordingly, in addition to the effect of claim 1, this provides an effect that allows saving the manufacturing cost.

DESCRIPTION OF EMBODIMENTS

Figure 1:
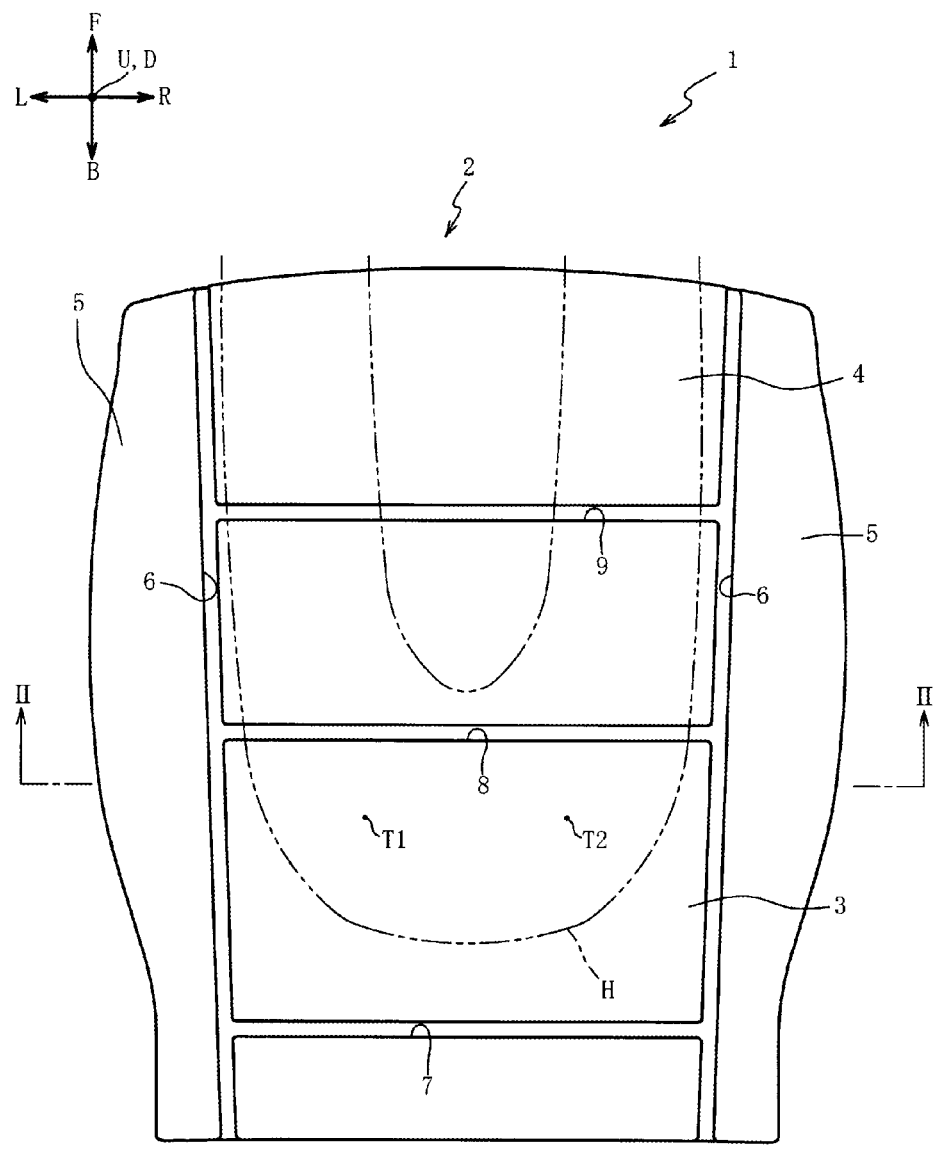
FIG. 1 is a plan view of a cushion pad according to a first embodiment of the present invention.

Hereinafter, a description will be given of preferred embodiments of the present invention with reference to the accompanying drawings. FIG. 1 is a plan view of a cushion pad 1 according to a first embodiment of the present invention. In this embodiment, a description will be given of the cushion pad 1 mounted on a vehicle (in particular, an automobile) having vibration. Note that, the respective arrows U-D, L-R, and F-B in FIG. 1 denote the above-below direction, the right-left direction, and the front-rear direction of a vehicle (not shown) on which the cushion pad 1 is mounted (the same applies to FIG. 2).

As illustrated in FIG. 1, the cushion pad 1, which is a base material integrally molded with the flexible polyurethane foam (one type of foamed synthetic resin material), includes: a support portion 2, which supports the buttocks and the back side of the thigh of a seated person H; and side support portions 5, which are arranged on both sides of the support portion 2 in the right-left direction (the arrow L-R direction). The side support portions 5 are portions that support the side portions of the thigh and the buttocks.

The support portion 2 is partitioned by a lateral groove 8, which extends in the right-left direction, into: a rear support portion 3, which supports the buttocks; and a front support portion 4, which supports the back side of the thigh. The rear support portion 3 supports the buttocks including the right and left ischial tuberosity portions T1 and T2 of the seated person H in a seated state. In the rear support portion 3 and the front support portion 4, the respective lateral grooves 7 and 9 are depressed parallel to the lateral groove 8. In the boundary portion between the support portion 2 and the side support portion 5, a pair of longitudinal grooves 6, which extends in the front-rear direction (the arrow F-B direction) is formed. The pair of longitudinal grooves 6 couples to the respective both ends of the lateral grooves 7, 8, and 9. The longitudinal groove 6 and the lateral grooves 7, 8, and 9 are portions for pulling and securing a surface skin (not shown) such as fabric, artificial leather, or leather to the cushion pad 1.

Figure 2:
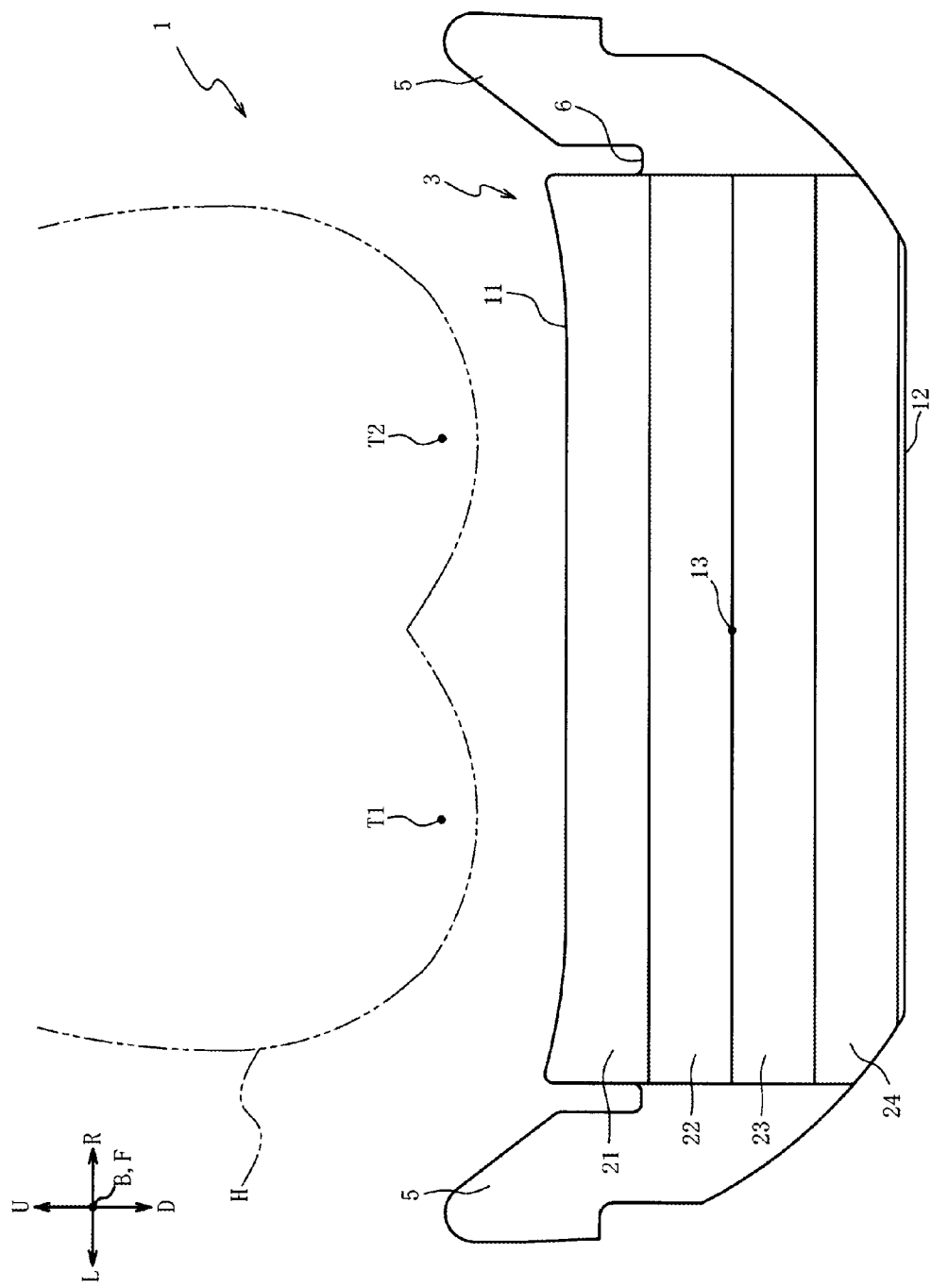
FIG. 2 is a schematic diagram where test pieces as an equally divided support portion are overlapped with a cross-sectional view of the cushion pad taken along the line II-II in FIG. 1.

The cushion pad 1 has a feature in the hardness distribution in the above-below direction (the arrow U-D the direction) of the support portion 2 (the rear support portion 3). In this embodiment, a layered test piece sampled from the rear support portion 3 (molded object) is used to measure the hardness so as to obtain the hardness distribution. Referring to FIG. 2, the sampling positions of the test piece will be described. FIG. 2 is a schematic diagram where the test pieces sampled by equally dividing the support portion 2 (the rear support portion 3) in the thickness direction (the above-below direction) are overlapped with a cross-sectional view of the cushion pad 1 taken along the line II-II in FIG. 1.

As illustrated in FIG. 2, the rear support portion 3 is a portion formed on the inner side of the pair of longitudinal grooves 6 and 6 in the right-left direction, has a seating surface 11, on which the seated person H is seated, and a bottom surface 12 on the opposite side of the seating surface 11, and has a cross section formed in an approximately horizontally long rectangular shape. The rear support portion 3 is equally divided in the above-below direction (the arrow U-D direction) to measure the hardness. A plurality of layered test pieces is sampled.

In this embodiment, the rear support portion 3 (the support portion) in the above-below direction (the arrow U-D direction) is equally sectionalized into four layers. The four layers formed by equally dividing the rear support portion 3 into four portions in the above-below direction (the arrow U-D direction) are: a seating layer 21 including the seating surface 11; a first core layer 22 positioned under the seating layer 21; a second core layer 23 positioned under the first core layer 22; and a bottom surface layer 24, which is positioned under the second core layer 23 and includes the bottom surface 12. The seating layer 21 and the first core layer 22 are positioned on the seating surface 11 side of a thickness center 13 as the center of the rear support portion 3 in the thickness direction. The second core layer 23 and the bottom surface layer 24 are positioned on the bottom surface 12 side of the thickness center 13.

For the sampled test piece, the 25% hardness is measured in compliance with D method specified in JIS K6400-2 (the 2012 edition). JIS K6400-2 is Japanese Industrial Standards made by based on ISO 2439 (Fourth Edition: issued in 2008), ISO 3386-1 (Second Edition: issued in 1986), and ISO 3386-2 (Second Edition: issued in 1997). According to this testing method, the test piece is placed on a support plate (not shown) in the state where the respective layers are flat, and the centers of the respective layers are pre-compressed by a pressure plate (not shown) as a flat disk having a diameter of 200 mm. Then, the test piece is pressurized to have a thickness of 25±1% of the thickness of the test piece at a rate of 100±20 mm/minute. The force (unit: N) after holding this state for 20±1 seconds is the 25% hardness of the layer. In this description, the 25% hardness is defined as "hardness."

It is to be noted that, the bottom surface layer 24 is placed on a support plate (not shown) side while facing the bottom surface 12 side after a reinforced fabric (not shown) molded integrally with the bottom surface 12 is removed. Then, the hardness is measured. This is for reducing the influence of the reinforced fabric. Furthermore, the seating layer 21 is placed while the seating surface 11 side faces a support plate (not shown) side, and the hardness is measured. This is for reducing the skin layer.

For the cushion pad 1, the hardness (25% hardness) of the seating layer 21 is preferably set to 120 to 220 N. In the case where the hardness of the seating layer 21 is less than 120 N, the hardness of the seating layer 21 becomes low. This increases sinking so as to cause poor seating comfort and be likely to cause a bottom-hitting feeling. On the other hand, in the case where the hardness of the seating layer 21 exceeds 220 N, a hard touch feeling is provided during seating so as to reduce the comfort.

For the cushion pad 1, the thickness (the dimension in the above-below direction) of the support portion 2 is preferably set to 30 to 80 mm. A thickness thinner than 30 mm deteriorates the touch feeling during seating, and a thickness thicker than 80 mm causes a large height so as to increase the installation space.

The seating layer 21, the first core layer 22, the second core layer 23, and the bottom surface layer 24 are set to approximately the identical hardness. Specifically, the ratio of the hardness of the bottom surface layer 24 to the hardness of the seating layer 21 is set to 1.0 to 1.1. It is to be noted that, the ratio of the hardness of the "bottom surface layer" to the hardness of the "seating layer" is the value obtained by rounding the quotient of the hardness of the bottom surface layer is divided by the hardness of the seating layer to one decimal place.

Accordingly, the hardness of the seating layer 21 is identical to the hardness of the bottom surface layer 24 or slightly smaller than the hardness of the bottom surface layer 24. This allows providing a soft feeling to the seated person H during seating. This consequently provides a fit feeling of the buttocks to the seated person H. Furthermore, when the hardness of the bottom surface layer 24 is 1.0 to 1.1 with respect to the hardness of the seating layer 21, the bottom surface layer 24 can support the load of the seated person H while reducing the increase in reactive force by the bottom surface layer 24. This consequently allows reducing the bottom-hitting feeling.

Here, in the case where the ratio of the hardness of the bottom surface layer 24 to the hardness of the seating layer 21 is less than 1.0, sinking of the bottom surface layer 24 is likely to occur and thus a bottom-hitting feeling is likely to be provided. On the other hand, in the case where the ratio of the hardness of the bottom surface layer 24 to the hardness of the seating layer 21 exceeds 1.1, the reactive force of the bottom surface layer 24 (the touch feeling of contact with the bottom surface layer 24) is likely to provide a bottom-hitting feeling.

Furthermore, the ratio of the hardness of the first core layer 22 to the hardness of the seating layer 21 is set to 1.0 to 1.1. Accordingly, the first core layer 22 allows reducing the increase in reactive force by the first core layer 22 while supporting the load of the seated person H. This allows further reducing the bottom-hitting feeling.

Here, in the case where the ratio of the hardness of the first core layer 22 to the hardness of the seating layer 21 is less than 1.0, sinking of the first core layer 22 is likely to occur so as to cause poor seating comfort. On the other hand, in the case where the ratio of the hardness of the first core layer 22 to the hardness of the seating layer 21 exceeds 1.1, the reactive force (the touch feeling of contact with the first core layer 22) of the first core layer 22 is likely to provide a bottom-hitting feeling.

Furthermore, the ratio of the hardness of the second core layer 23 to the hardness of the seating layer 21 is set to 1.0 to 1.1. Accordingly, the second core layer 23 allows reducing the increase in reactive force by the second core layer 23 while supporting the load of the seated person H. This allows further reducing the bottom-hitting feeling.

Here, in the case where the ratio of the hardness of the second core layer 23 to the hardness of the seating layer 21 is less than 1.0, sinking of the second core layer 23 is likely to occur so as to cause poor seating comfort. On the other hand, in the case where the ratio of the hardness of the second core layer 23 to the hardness of the seating layer 21 exceeds 1.1, the reactive force of the second core layer 23 (the touch feeling of contact with the second core layer 23) is likely to provide a bottom-hitting feeling.

Furthermore, the ratio of the hardness of the bottom surface layer 24 to the hardness of the first core layer 22 is set to 1.0 to 1.1. Accordingly, the bottom surface layer 24 allows reducing the increase in reactive force by the bottom surface layer 24 while supporting the load of the seated person H. This allows further reducing the bottom-hitting feeling.

Here, in the case where the ratio of the hardness of the bottom surface layer 24 to the hardness of the first core layer 22 is less than 1.0, sinking of the bottom surface layer 24 is likely to occur so as to cause poor seating comfort and the bottom-hitting feeling is likely to be provided. On the other hand, in the case where the ratio of the hardness of the bottom surface layer 24 to the hardness of the first core layer 22 exceeds 1.1, the reactive force of the bottom surface layer 24 (the touch feeling of contact with the bottom surface layer 24) is likely to provide a bottom-hitting feeling.

It is to be noted that, the rear support portion 3 is integrally molded by a single foamed synthetic resin material. Accordingly, in the manufacturing process of the cushion pad, this allows eliminating the processes for burying an insert material to adjust the hardness and for laminating a plurality of layers having similar hardnesses. This allows saving the manufacturing cost of the cushion pad 1.

The following describes a method for manufacturing the cushion pad 1. The cushion pad 1 is manufactured by injecting a compound liquid (foamable raw liquid) containing a polyol component, a polyisocyanate component, a foaming agent, and a catalyst to a molding die (the lower die) and foam molding inside the molding die (the lower die and the upper die). It is to be noted that, the cushion pad 1 can be molded integrally with the bottom surface 12 by preliminarily attaching a reinforced fabric such as coarse wool cloth and nonwoven fabric on the molding die (the upper die). Furthermore, after the cushion pad 1 is molded, a reinforced fabric can be bonded to the bottom surface 12.

The polyol component can employ polyetherpolyol, polyester polyol, polycarbonate polyol, polyolefin polyol, and lactone-based polyol. One kind or the mixture of two or more kinds of these components can be used. Among these, polyetherpolyol is preferred because the raw material cost is low and the water resistance is excellent.

As necessary, polymer polyol can be used in combination. Polymer polyol employs, for example, material obtained by graft-copolymerizing a polymer component such as polyacrylonitrile and acrylonitrile-styrene copolymer to polyetherpolyol containing polyalkylene oxide.

The weight average molecular weight of the polyol component is preferred to be 6000 to 10000. In the case where the weight average molecular weight is less than 6000, the flexibility of the obtained foam is lost such that degradation in physical property or a decrease in elastic performance is likely to occur. In the case where the weight average molecular weight exceeds 10000, the hardness of the foam is likely to decrease.

The polyisocyanate component can employ publicly-known various polyfunctional aliphatic, alicyclic, and aromatic isocyanates. For example, tolylene diisocyanate (TDI), methylene diphenyl diisocyanate (MDI), dicyclohexylmethane diisocyanate, triphenyl diisocyanate, xylene diisocyanate, polymethylene polyphenylene polyisocyanate, hexamethylene diisocyanate, isophorone diisocyanate, ortho-toluidine diisocyanate, naphthylene diisocyanate, xylylene diisocyanate, lysine diisocyanate, and similar component can be employed. Among these, one kind may be used alone or two or more kinds may be used in combination.

MDI-based isocyanates typified by methylene diphenyl diisocyanate include, for example, methylene diphenyl diisocyanate (pure MDI), polyphenylene polymethylene polyisocyanate (polymeric MDI), polymeric body of these, urethane-modified body of these, urea-modified body, allophanate-modified body, biuret modified body, carbodiimide-modified body, uretonimine-modified body, uretdione-modified body, isocyanurate-modified body, and the mixture of two or more kinds of these.

Furthermore, terminal isocyanate prepolymer can also be used. Terminal isocyanate prepolymer is obtained by preliminarily causing a reaction of: polyol such as polyetherpolyol and polyester polyol; and polyisocyanate (such as TDI-based isocyanate and MDI-based isocyanate). Use of terminal isocyanate prepolymer allows controlling the viscosity of the compound liquid (foamable raw liquid), the primary structure of polymer, the compatibility, and it is preferable.

In this embodiment, the polyisocyanate component preferably employs MDI-based isocyanate, which allows molding an elastic foam having a small rebound resilience compared with the elastic foam by TDI-based isocyanate. In the case where the mixture of MDI-based isocyanate and TDI-based isocyanate is used, the mass ratio is set to MDI-based material:TDI-based material=100:0 to 75:25, preferably, 100:0 to 80:20. As the mass ratio of the TDI-based material in the polyisocyanate component becomes larger than 20/100, the wobbling feeling in the obtained product tends to decrease. When the mass ratio of the TDI-based material becomes larger than 25/100, this trend becomes remarkable. It is to be noted that, the isocyanate index (the percentage of the equivalence ratio of the isocyanate group to the active hydrogen group) of the polyisocyanate component is set to, for example, 85 to 130.

The foaming agent mainly employs water. As necessary, molding can also be performed by concomitantly using a small amount of a low boiling point organic compound such as cyclopentane, normal pentane, isopentane, and HFC-245fa or using a gas loading device so as to mix and dissolve air, nitrogen gas, liquefied carbon dioxide, or similar material in the raw liquid. The preferred addition amount of the foaming agent depends on the set density of the obtained product, but is normally 0.5 to 15 mass % with respect to the polyol component.

The catalyst can employ various urethane catalysts that are publicly-known in this field. For example, reactive amine such as triethylamine, tripropylamine, tributylamine, N-methylmorphiline, N-ethylmorpholine, dimethylbenzylamine, N,N,N',N'-tetramethylhexamethylenediamine, N,N,N',N',N''-pentamethyldiethylenetriamine, and bis-(2-

The following describes the present invention for more details using Examples. However, the present invention is not limited to these Examples. The compositions of the compound liquid (foamable raw liquid) for molding the cushion pad in Examples and Comparative examples are shown in Table 1. The numerical value shown in Table 1 denotes the unit mass (mass ratio). Furthermore, the isocyanate amount in Table 1 is the mass ratio of isocyanate to polyol (to 100 of polyol). Isocyanates 1 to 3 are the component ratios to the entire isocyanate.

TABLE 1

|  |  | Example 1 | Example 2 | Example 3 | Example 4 | Comparative example 1 | Comparative example 2 | Comparative example 3 |
|---|---|---|---|---|---|---|---|---|
| polyol | 1 | 80 | 80 | 80 | 80 |  |  |  |
|  | 2 |  |  |  |  | 60 | 60 | 60 |
|  | 3 | 20 | 20 | 20 | 20 | 40 | 40 | 40 |
| crosslinking agent | 1 | 1.0 | 1.0 | 1.0 | 1.0 | 1.5 | 1.5 | 1.5 |
|  | 2 |  |  |  |  | 2.5 | 2.5 | 2.5 |
| cell opener |  | 2.0 | 2.0 | 2.0 | 2.0 |  |  |  |
| foam stabilizer | 1 | 1.0 | 1.0 | 1.0 | 1.0 | 0.3 | 0.3 | 0.3 |
|  | 2 |  |  |  |  | 0.7 | 0.7 | 0.7 |
| catalyst | 1 | 0.45 | 0.45 | 0.45 | 0.45 | 0.45 | 0.45 | 0.45 |
|  | 2 | 0.05 | 0.05 | 0.05 | 0.05 | 0.10 | 0.10 | 0.10 |
| water |  | 2.2 | 2.2 | 2.2 | 2.2 | 2.4 | 2.4 | 2.4 |
| isocyanate amount |  | 44.4 | 44.4 | 44.4 | 44.4 | 35.7 | 35.7 | 35.7 |
| isocyanate | 1 |  | 5 | 15 | 25 | 80 | 70 | 60 |
|  | 2 | 100 | 95 | 85 | 75 |  |  |  |
|  | 3 |  |  |  |  | 20 | 30 | 40 |
| hardness | seating layer | 1.00 | 1.00 | 1.00 | 1.00 | 1.00 | 1.00 | 1.00 |
|  | first core layer | 1.04 | 1.03 | 1.03 | 1.03 | 0.89 | 0.88 | 0.87 |
|  | second core layer | 1.03 | 1.03 | 1.05 | 1.06 | 0.91 | 0.86 | 0.90 |
|  | bottom surface layer | 1.03 | 1.05 | 1.07 | 1.09 | 0.84 | 0.85 | 0.84 |
| bottom-hitting feeling |  | Excellent | Excellent | Excellent | Good | Poor | Poor | Poor | dimethylaminoethyl) ether, or organic acid salt of these; metal carboxylate such as potassium acetate and potassium octoate, or an organic metal compound such as stannous octoate, dibutyl tin dilaurate, and zinc naphthenate can be employed. Furthermore, an amine catalyst having an active hydrogen group such as N,N-dimethylethanolamine and N,N-diethylethanolamine is also preferred. The preferred addition amount of the catalyst is 0.01 to 10 mass % with respect to the polyol component.

As necessary, a polyvalent active hydrogen compound having a low molecular weight is used as a crosslinking agent. The crosslinking agent facilitates the adjustment of the spring property of the cushion pad. The crosslinking agent employs, for example: polyhydric alcohols such as ethylene glycol, propylene glycol, 1,4-butanediol, trimethylolpropane, and glycerin; a compound obtained by polymerizing ethylene oxide or propylene oxide using these polyhydric alcohols as an initiator; and alkanolamines such as monoethanolamine, diethanolamine, triethanolamine, and N-methyldiethanolamine. These compounds can be used alone or as the mixture of two or more kinds.

Furthermore, a foam stabilizer is used as necessary. The foam stabilizer can employ an organic silicon-based surfactant that is publicly-known in this field. The preferred addition amount of the foam stabilizer is 0.1 to 10 mass % with respect to the polyol component. Further, as necessary, a flame retardant, a plasticizer, a cell opener, an oxidation inhibitor, an ultraviolet absorber, a colorant, various fillers, an internal mold release agent, or other process aids are used.

Furthermore, the respective components described on Table 1 are as follows.
polyol 1: polyetherpolyol EP828 (made by Mitsui Chemicals, Inc.), weight average molecular weight 6000
polyol 2: polyetherpolyol EP330N (made by Mitsui Chemicals, Inc.), weight average molecular weight 5000
polyol 3: polymer polyol POP3623 (made by Mitsui Chemicals, Inc.)
crosslinking agent 1: diethanolamine
crosslinking agent 2: EL980 (made by ASAHI GLASS CO., LTD.)
cell opener: EP505S (made by Mitsui Chemicals, Inc.)
foam stabilizer 1: SZ1336 (made by Dow Corning Toray Co., Ltd.)
foam stabilizer 2: SZ1325 (made by Dow Corning Toray Co., Ltd.)
catalyst 1: TEDA L33 (made by TOSOH CORPORATION)
catalyst 2: ToyocatET (made by TOSOH CORPORATION)
isocyanate 1: tolylene diisocyanate TDI-80 (made by Mitsui Chemicals, Inc.)
isocyanate 2: polymeric MDI 2,4'-MDI.4,4'-mixture of MDI
isocyanate 3: polymeric MDI MR200 (made by Nippon Polyurethane Industry Co., Ltd (TOSOH CORPORATION)))

Respective these components were combined by an ordinary method using the mass ratios shown in Table 1 so as to be uniformly mixed. Subsequently, a predetermined amount of the mixture was injected to the molding die (the lower die) for a cushion pad in a predetermined shape and was foamed and hardened inside the cavity so as to obtain cushion pads in Examples 1 to 4 and Comparative examples 1 to 3. For all the cushion pads, bottom-hitting feeling was evaluated by a sensory test when an examinee was seated. The evaluation of the bottom-hitting feeling was ranked in three levels, which is Excellent: considerably excellent with small bottom-hitting feeling, Good, and Poor: large bottom-hitting feeling, and the result was shown in Table 1.

Furthermore, for all the cushion pads, the rear support portion 3 was equally divided into four portions in the thickness direction (having 20 mm for each thickness) to sample four test pieces (the seating layer 21, the first core layer 22, the second core layer 23, and the bottom surface layer 24) (see FIG. 2). Then, the 25% hardnesses in the respective center portions were measured in compliance with D method specified in JIS K6400-2 (the 2012 edition). After the measurement, the ratios (the hardnesses of the respective layers is divided by the hardness of the seating layer 21) of the hardnesses of the respective layers to the hardness of the seating layer 21 were calculated (rounded to two decimal places), and were listed in Table 1.

According to Table 1, for Examples 1 to 4, the hardnesses of the first core layer 22, the second core layer 23, and the bottom surface layer 24 are set to be larger than the hardness of the seating layer 21. Furthermore, the ratio of the hardness of the first core layer 22 to the hardness of the seating layer 21, the ratio of the hardness of the second core layer 23 to the hardness of the seating layer 21, the ratio of the hardness of the bottom surface layer 24 to the seating layer 21, the ratio of the hardness of the bottom surface layer 24 to the first core layer 22 are all set to 1.0 to 1.1.

On the other hand, for Comparative examples 1 to 3, the hardnesses of the first core layer 22, the second core layer 23, and the bottom surface layer 24 are set to be smaller than the hardness of the seating layer 21. Furthermore, the ratio of the hardness of the first core layer 22 to the hardness of the seating layer 21, the ratio of the hardness of the second core layer 23 to the hardness of the seating layer 21, and the ratio of the hardness of the bottom surface layer 24 to the seating layer 21 are all set to 0.8 to 0.9.

In the sensory tests for Examples and Comparative examples made as described above, Examples 1 to 4 were evaluated to be excellent or considerably excellent in bottom-hitting feeling. In contrast, Comparative examples 1 to 3 were evaluated to have a large bottom-hitting feeling. These Examples find that the ratio of the hardness of the first core layer 22 to the hardness of the seating layer 21, the ratio of the hardness of the second core layer 23 to the hardness of the seating layer 21, the ratio of the hardness of the bottom surface layer 24 to the seating layer 21, and the ratio of the hardness of the bottom surface layer 24 to the first core layer 22 are all set to 1.0 to 1.1 so as to allow reducing the bottom-hitting feeling.

In particular, for Examples 1 to 4, the ratio of the hardness of the bottom surface layer 24 to the hardness of the seating layer 21 is set to 1.0 to 1.1. This allows the bottom surface layer 24 to support the load while reducing the increase in reactive force by the bottom surface layer 24. This consequently allows reducing the bottom-hitting feeling.

In contrast, when the ratio of the hardness of the bottom surface layer 24 to the hardness of the seating layer 21 is set to 0.8 to 0.9 like Comparative example, sinking of the bottom surface layer 24 is likely to occur. Accordingly, it is inferred that the thickness of the cushion pad supporting the load becomes actually thin and the bottom-hitting feeling is likely to occur.

Figure 3:
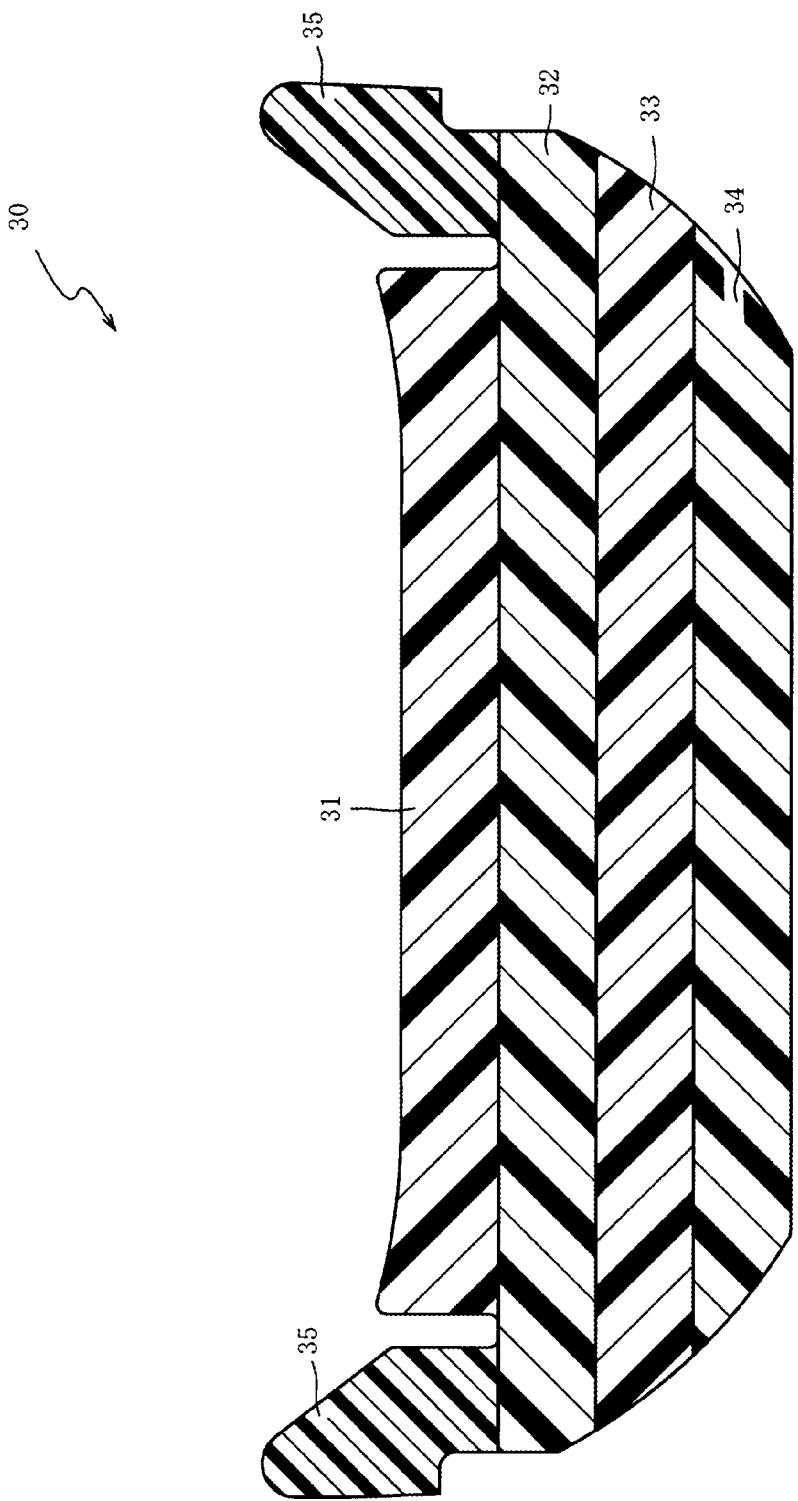
FIG. 3 is a cross-sectional view of a cushion pad according to a second embodiment.

Referring to FIG. 3, the following describes a second embodiment. In the first embodiment, the cushion pad integrally formed with the flexible polyurethane foam has been described. In contrast, in the second embodiment, a description will be given of a cushion pad formed by laminating a plurality of layered members. FIG. 3 is a cross-sectional view of a cushion pad 30 according to the second embodiment.

As illustrated in FIG. 3, the cushion pad 30 includes: a seating layer 31, on which the seated person is seated; a first core layer 32, which is arranged under the seating layer 31; a second core layer 33, which is arranged under the first core layer 32; and a bottom surface layer 34, which is arranged under the second core layer 33. On the outer side of the seating layer 31 in the right-left direction, a side support portions 35 are arranged. The seating layer 31, the first core layer 32, the second core layer 33, and the bottom surface layer 34 are bonded to one another to be laminated. The side support portions 35 are bonded to both right and left sides of the first core layer 32.

For the seating layer 31, the first core layer 32, the second core layer 33, and the bottom surface layer 34, the materials are selected such that the hardnesses of the first core layer 32, the second core layer 33, and the bottom surface layer 34 are larger than the hardness (the 25% hardness measured in compliance with D method specified in JIS K6400-2 (the 2012 edition)) of the seating layer 31. Furthermore, the ratio of the hardness of the first core layer 32 to the hardness of the seating layer 31, the ratio of the hardness of the second core layer 33 to the hardness of the seating layer 31, the ratio of the hardness of the bottom surface layer 34 to the seating layer 31, and the ratio of the hardness of the bottom surface layer 34 to the first core layer 32 are all set to 1.0 to 1.1.

In this embodiment, the seating layer 31, the first core layer 32, the second core layer 33, and the bottom surface layer 34 are all formed in a tabular shape using flexible polyurethane foam (molded urethane). The hardness distributions of the seating layer 31, the first core layer 32, the second core layer 33, and the bottom surface layer 34 are set similarly to the hardness distributions in the cushion pad 1 (the rear support portion 3) according to the first embodiment. Therefore, the description of these is omitted. The cushion pad 30 in the second embodiment allows achieving the operation and effect similar to those of the cushion pad 1 in the first embodiment.

As described above, the present invention has been described based on the above-mentioned embodiments. It will be appreciated that the present invention will not be limited to the embodiments described above, but various modifications are possible without departing from the technical scope of the present invention. For example, the shapes described in the above-mentioned embodiments are examples. Other shapes are obviously possible.

While in the above-described respective embodiments the cushion pads 1 and 30 to be mounted on a vehicle (automobile) have been described, this should not necessarily be construed in a limiting sense. The cushion pads 1 and 30 may obviously be applied to a cushion material equipped with another transportation means such as a vehicle (such as a railway vehicle), a ship, and an aircraft other than the automobile or applied to a cushion material of furniture or similar product.

While in the above-described first embodiment, for convenience, a description has been given of the case where the integrally molded cushion pad 1 (the rear support portion 3) made of foamed synthetic resin (made of flexible polyurethane foam) is sectionalized into four layers in the above-below direction are sampled to measure the hardness, the number (the number of layers) of the test pieces is not limited to these. The thickness of the test piece can be set to a size that allows measurement of the hardness as necessary. Furthermore, taking into consideration the thickness of the test piece to allow measurement of the hardness, the number of the test pieces (the number of layers) can be set to the number that allows sampling of the test piece having this thickness as necessary. It is to be noted that, taking into consideration the size the cushion pad 1 (the rear support portion 3), it is appropriate to sectionalize the rear support portion 3 into four layers or five layers. Furthermore, the thickness of the test piece is preferred to be 20 to 25 mm in length.

While in the above-described respective embodiments a description has been given of the case where the side support portions 5 and 35 are disposed in the cushion pads 1 and 30, this should not necessarily be construed in a limiting sense. The side support portions 5 and 35 can be omitted. This is because the cushion pads 1 and 30 (the support portion 2) are excellent in fit feeling and excellent in holding property (restraint property) of the side portions of the buttocks and the thigh.

While in the above-described respective embodiments a description has been given of the case where the rear support portion 3 have a predetermined hardness distribution, the front support portion 4 can also be set to have a hardness distribution similar to that of the rear support portion 3.

While in the above-described respective embodiments a description has been given of the cushion pads 1 and 30 where the longitudinal groove 6 and the lateral grooves 7, 8, and 9, which are depressed on the surface, are used to pull and secure the surface skin (not shown), this should not necessarily be construed in a limiting sense. It is obviously possible to employ a cushion pad where an adhesive is applied over the surface so as to bond (attach) the surface skin.

While in the above-described second embodiment a description has been given of the case where the seating layer 31, the first core layer 32, the second core layer 33, and the bottom surface layer 34 are all formed with the flexible polyurethane foam (molded urethane) molded by the molding die in a predetermined shape, this should not necessarily be construed in a limiting sense. It is obviously possible to employ other materials. The other materials include, for example, slab urethane formed by cutting off the molded flexible polyurethane foam, chip urethane formed by crushing the listing and similar material generated in the manufacturing process of the flexible polyurethane foam, a three dimensional net-like body constituted of a plurality of three-dimensionally intertwined fibers made of synthetic resin, a fiber body such as solid cotton, a synthetic resin-made elastic body such as urethane rubber and thermoplastic elastomer. Laminating these materials allows obtaining a predetermined hardness distribution. The hardnesses, the densities, and the shapes of the seating layer 31, the first core layer 32, the second core layer 33, and the bottom surface layer 34 are set as necessary by, for example, selecting materials, designing the cavity shape of the molding die, cutting, and machining.

Furthermore, in the above-described second embodiment, a description is given of the case where the respective layers of the seating layer 31, the first core layer 32, the second core layer 33, and the bottom surface layer 34 are formed in a tabular shape. This should not necessarily be construed in a limiting sense. These layers can obviously be formed in a curved plate shape. This is because the seating layer 31, the first core layer 32, the second core layer 33, and the bottom surface layer 34 can be molded into a predetermined shape by mold forming, cutting, or similar method. It is obviously possible to form these layers in a curved plate shape so as to dispose the portion having a large hardness on the lateral side of the buttocks of the seated person.

The invention claimed is:

1. A cushion pad, comprising:
a support portion including
a seating layer including a seating surface configured such that a seated person may be seated on the seating surface; and
a bottom surface layer including a bottom surface on an opposite side to the seating surface,
wherein a ratio of a hardness of the bottom surface layer to a hardness of the seating layer is 1.0 to 1.1, and
wherein the hardness is a 25% hardness measured in compliance with D method specified in the 2012 edition of JIS K6400-2.

2. The cushion pad according to claim 1,
wherein the support portion further comprises a first core layer positioned between a thickness center and the seating layer, the thickness center being a center in the thickness direction sandwiched between the seating surface and the bottom surface, and
wherein a ratio of a hardness of the first core layer to the hardness of the seating layer is 1.0 to 1.1.

3. The cushion pad according to claim 2, wherein a ratio of the hardness of the bottom surface layer to the hardness of the first core layer is 1.0 to 1.1.

4. The cushion pad according to claim 1,
wherein the support portion further comprises a second core layer positioned between a thickness center and the bottom surface layer, the thickness center being a center in the thickness direction sandwiched between the seating surface and the bottom surface, and
wherein a ratio of a hardness of the second core layer to the hardness of the seating layer is 1.0 to 1.1.

5. The cushion pad according to claim 1, wherein the support portion is an integrally molded single foamed synthetic resin material.

6. The cushion pad according to claim 1, wherein the 25% hardness of the seating layer is 120 N to 220 N.

* * * * *